US011159309B2

(12) United States Patent
Seyfried et al.

(10) Patent No.: US 11,159,309 B2
(45) Date of Patent: Oct. 26, 2021

(54) OBTAINING QUORUM APPROVAL TO PERFORM AN OPERATION WITH A CRYPTOGRAPHIC ITEM OF A KEY MANAGEMENT SYSTEM

(71) Applicant: Fortanix, Inc., Mountain View, CA (US)

(72) Inventors: Jeffrey Seyfried, Cupertino, CA (US); Jethro Gideon Beekman, San Francisco, CA (US); Anand Kashyap, Los Altos, CA (US)

(73) Assignee: Fortanix, Inc., Mountain View, CA (US)

( * ) Notice: Subject to any disclaimer, the term of this patent is extended or adjusted under 35 U.S.C. 154(b) by 308 days.

(21) Appl. No.: 16/228,651

(22) Filed: Dec. 20, 2018

(65) Prior Publication Data

US 2020/0204357 A1  Jun. 25, 2020

(51) Int. Cl.
*H04L 9/08* (2006.01)

(52) U.S. Cl.
CPC .......... *H04L 9/0819* (2013.01); *H04L 9/0894* (2013.01)

(58) Field of Classification Search
CPC ... H04L 9/0189; H04L 9/0894; H04L 9/0819; G06F 21/602
USPC ........................................................ 713/171
See application file for complete search history.

(56) References Cited

U.S. PATENT DOCUMENTS

| 6,839,437 | B1 * | 1/2005 | Crane | G06F 21/602 |
| | | | | 380/277 |
| 9,572,029 | B2 * | 2/2017 | Gaudet | H04L 63/0853 |
| 10,693,638 | B1 * | 6/2020 | Cignetti | H04L 9/3247 |
| 2015/0086020 | A1 * | 3/2015 | Harjula | H04L 9/30 |
| | | | | 380/279 |
| 2015/0271158 | A1 * | 9/2015 | Ronca | H04L 9/0819 |
| | | | | 713/168 |
| 2018/0191501 | A1 * | 7/2018 | Lindemann | G06F 3/0647 |

* cited by examiner

*Primary Examiner* — Bryan F Wright
(74) *Attorney, Agent, or Firm* — Lowenstein Sandler LLP

(57) ABSTRACT

A request to perform an operation with a cryptographic item may be received. A request for approval to perform the requested operation with the cryptographic item may be transmitted to a set of entities based on a policy associated with the cryptographic item. Indications of approval to perform the requested operation may be received from corresponding entities of the set of entities. A determination as to whether a number of the received indications of approval to perform the requested operation with the cryptographic item satisfies a threshold number may be made. In response to determining that the number of the received indications of approval from the corresponding entities of the set of entities satisfies the threshold number, the requested operation may be performed with the cryptographic item.

20 Claims, 9 Drawing Sheets

450

APPROVAL STATUS

Operation Status: Performed

Entity 1: Approved
Entity 2: Rejected
Entity 3: Approved

FIG. 4C

APPROVAL STATUS

Operation Status: Pending

Item A

Entity 1: Approved
Entity 2: Rejected
Entity 3: Pending

Item B

Entity 4: Approved
Entity 5: Approved
Entity 6: Rejected
Entity 7: Approved

APPROVAL STATUS

Operation Status: Performed

Item A

Entity 1: Approved
Entity 2: Rejected
Entity 3: Approved

Item B

Entity 4: Approved
Entity 5: Approved
Entity 6: Rejected
Entity 7: Approved

OBTAINING QUORUM APPROVAL TO PERFORM AN OPERATION WITH A CRYPTOGRAPHIC ITEM OF A KEY MANAGEMENT SYSTEM

BACKGROUND

Aspects of the present disclosure relate generally to a key management system, and more specifically, relate to obtaining quorum approval to perform an operation with a cryptographic item of a key management system. A key management system may reside in a secure enclave of a computing system that is cryptographically isolated from applications and operating systems executed by the computing system. The key management system may include one or more cryptographic keys, cryptographic plugins, or identifications of entities. The key management system may receive requests from applications to perform operations associated with the cryptographic keys, cryptographic plugins, or identifications of entities of the key management system.

SUMMARY OF INVENTION

The present disclosure relate to obtaining quorum approval to perform an operation with a cryptographic item of a key management system.

BRIEF DESCRIPTION OF THE DRAWINGS

The present disclosure will be understood more fully from the detailed description given below and from the accompanying drawings of various implementations of the disclosure.

FIG. 4C illustrates a user interface to determine that a requested operation has been performed by the key management system in accordance with some embodiments of the disclosure.

DETAILED DESCRIPTION

Figure 1:
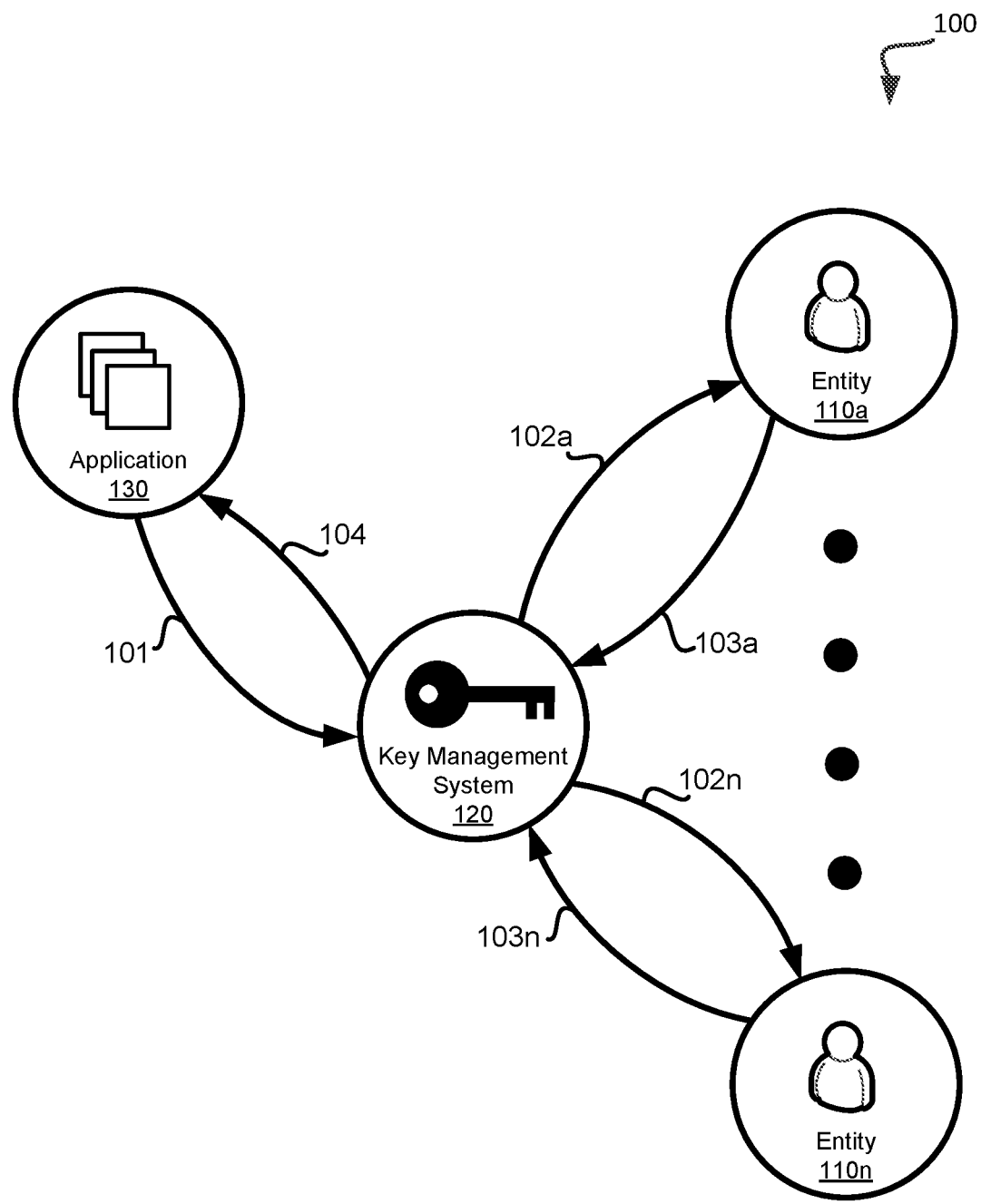
FIG. 1 illustrates an example environment to provide a key management system in accordance with some embodiments.

In general, a key management system may reside in a secure enclave of a computing system that is cryptographically isolated from applications and operating systems executed by the computing system. The key management system may store one or more cryptographic items for various applications. The cryptographic items may be cryptographic keys and/or cryptographic plugins. The key management system may receive requests from applications to perform operations associated with the cryptographic items of the key management system. Such operations may include, but are not limited to, exporting a cryptographic item, encrypting data using the cryptographic item, modifying a cryptographic item, deleting a cryptographic item and/or entity, etc. Generally, performing such operations on a cryptographic item may require a user of the application to have authorization to perform the operations. If the user of the application has the authorization required to perform the operation with the cryptographic item, then the key management system may perform the operation requested by the application.

However, allowing a single user to have authorization to unilaterally perform operations on the cryptographic items stored at the key management system may compromise the security of the cryptographic items. For example, a malicious administrator having the required authorization may delete cryptographic items stored at the key management system. Thus, if another user of an application seeks to perform an operation with a cryptographic item that the malicious administrator has deleted, then the key management system would not be able to perform the operation as the cryptographic item has been deleted. In another example, an administrator system may be compromised by malicious software (e.g., malware) that may utilize the authorization of the administrator system to export cryptographic keys stored at the key management system. As a result, a malicious entity may receive the cryptographic keys that were intended to be secure and may thus compromise the security of other applications that use the cryptographic keys in other operations.

Aspects of the present disclosure address the above and other deficiencies by obtaining quorum approval to perform an operation with a cryptographic item of a key management system. A key management system may receive a request from an application to perform an operation on a cryptographic item stored at the key management system. For example, the key management system may receive a request from an application to export a cryptographic key stored at the key management system. The cryptographic items stored at the key management system may be assigned to one or more entities (i.e., a group of entities) that correspond to a user or application that has the ability to approve operations being performed with cryptographic items assigned to the particular entities. The entities may each have an associated identifier and contact information stored in a data structure at the key management system that may be utilized by the key management system to acquire approval for operations.

Upon receiving the request to perform the operation, the key management system may identify a quorum policy (also referred to as "policy" hereafter) for the cryptographic item based on the group assigned to the cryptographic item. The policy may identify particular operations, such as exporting a cryptographic key, that require quorum approval by the entities of the group before performance of the operation is initiated or completed. The quorum approval may correspond to a minimum number of approvals that are to be received from the entities of the group before the operation is performed. For example, if a group includes three entities that approve operations, then quorum approval for the operation may be received when approval from two out of the three entities has been received.

If the key management system determines that the requested operation received from the application requires quorum approval based on the policy, then the key management system may transmit an indication to the application that quorum approval is required before the operation is performed. The indication may identify a number of entities in the group that need to approve the operation before the operation is performed. In embodiments, the indication may include a prompt for the application to submit an approval request to the key management system.

In embodiments, upon receiving the approval request from the application, the key management system may transmit a request for approval to the entities of the group. The request for approval may include transmitting a notification, such as an email or text message, that notifies entities that an approval is pending. The notification may be transmitted to a device associated with the approving entity using the contact information of the entity stored in the data structure at the key management system. For example, the key management system may transmit an email to the approving entities of a group by identifying email addresses of the approving entities for a group in the data structure.

The key management system may provide a user interface to the approving entities. The user interface may be a graphical user interface (GUI) that shows the pending approvals for a particular entity. The GUI may provide information associated with each of the pending approvals. For example, for each pending approval, the GUI may identify a type of the requested operation, an identification of the entity requesting the operation, the cryptographic items that the operation is to be performed on and the approval status of the approving entities. The GUI may include one or more selectable icons that allow an approving entity to either approve or reject the requested operation. In some embodiments, another GUI may be provided to a user of the application requesting the performance of the operation. Such a GUI may identify whether particular entities have approved or rejected the performance of the operation.

The key management system may determine whether a number of received approvals from the approving entities satisfy the quorum policy. For example, if a quorum policy of a cryptographic item requires two out of three approving entities to approve an operation on the cryptographic item, then the quorum policy is satisfied when two approving entities have approved the operation. If the number of received approvals satisfies the quorum policy, then the key management system may perform the requested operation. For example, if the requested operation is to export a cryptographic key, then the key management system may transmit the cryptographic key to the requesting application. Otherwise, if the number of received approvals does not satisfy the quorum policy, then the key management system may not perform the requested operation.

Advantages of the present disclosure include, but are not limited to, improving the security of cryptographic items stored by a key management system. By requiring quorum approval before sensitive operations are performed by the key management system, a malicious administrator is unable to unilaterally perform sensitive operations that may compromise the security of the cryptographic items. Thus, the utilization of a quorum approval results in an enhanced security for cryptographic items of the key management system since multiple approvals are required before sensitive operations are performed by the key management system.

FIG. 1 illustrates an example environment 100 to provide a key management system. The environment 100 may correspond to network servers that provide an interaction between an application and the key management system as well as between the key management system and one or more approving entities.

As shown in FIG. 1, the environment 100 may correspond to a network cluster or a data center. For example, a first network server may provide the key management system 120 and a second network server may provide an application 130. In some embodiments, a same network server may provide both the application 130 and the key management system 120. The environment may also include entities 110a-n that correspond to computing devices associated with approving entities. The computing devices of entities 110a-n may be computing devices such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like.

A network connection may couple the application 130 with the key management system 120. In some embodiments, the network connection may be a network connection between a network server that provides the application 130 and another network server that provides the key management system 120. In embodiments, the network connection may be a local connection associated with a network server that provides both the application 130 and the key management system 120. A second network connection may couple entities 110a-n with the key management system 120. The network connection may be a network connection between a network server that provides the key management system 120 and client devices associated with entities 110a-n. Entities 110a-n may be approving entities that may approve or reject operations to be performed on cryptographic items of the key management system.

The key management system 120 may reside in a secure location of a network server. Examples of such a secure location include, but are not limited to, a secure enclave. Further details with regards to a secure enclave are described in conjunction with FIG. 7. The key management system 120 may be a hardware security module (HSM), a key management service (KMS), or any other software or hardware resource that stores cryptographic items, such as cryptographic keys and plugins. Thus, the key management system 120 may store and manage cryptographic items for use by different applications provided by different network servers in the secure location.

In operation, the key management system 120 may receive a request 101 from the application 130 to perform an operation with a cryptographic item stored at the key management system 120. In response to receiving the request, key management system 120 may identify a quorum policy associated with the cryptographic item. Upon determining that quorum approval is required to perform the operation based on the quorum policy, the key management system 120 may transmit requests for approval 102*a-n* to entities 110*a-n*. The key management system 120 may receive indications of approval 103*a-n* from entities 110*a-n*. Upon receiving the number of indications of approval specified by the quorum policy, the key management system 120 may perform the requested operation with the cryptographic item. The key management system may subsequently provide the results 104 of the requested operation to application 130. For example, the cryptographic item may be a cryptographic key and the operation may correspond to encrypting or decrypting data with the cryptographic key. The results of the encryption operation or the decryption operation may be the resulting data that is provided to the application 130. In some embodiments, the application 130 may verify a status of the operation at the key management system and may subsequently retrieve the results 104 of the requested operation after the status indicates that the operation has been approved or has been performed. Further details with regards to the key management system 120 are described in conjunction with FIGS. 2-7.

Figure 2:
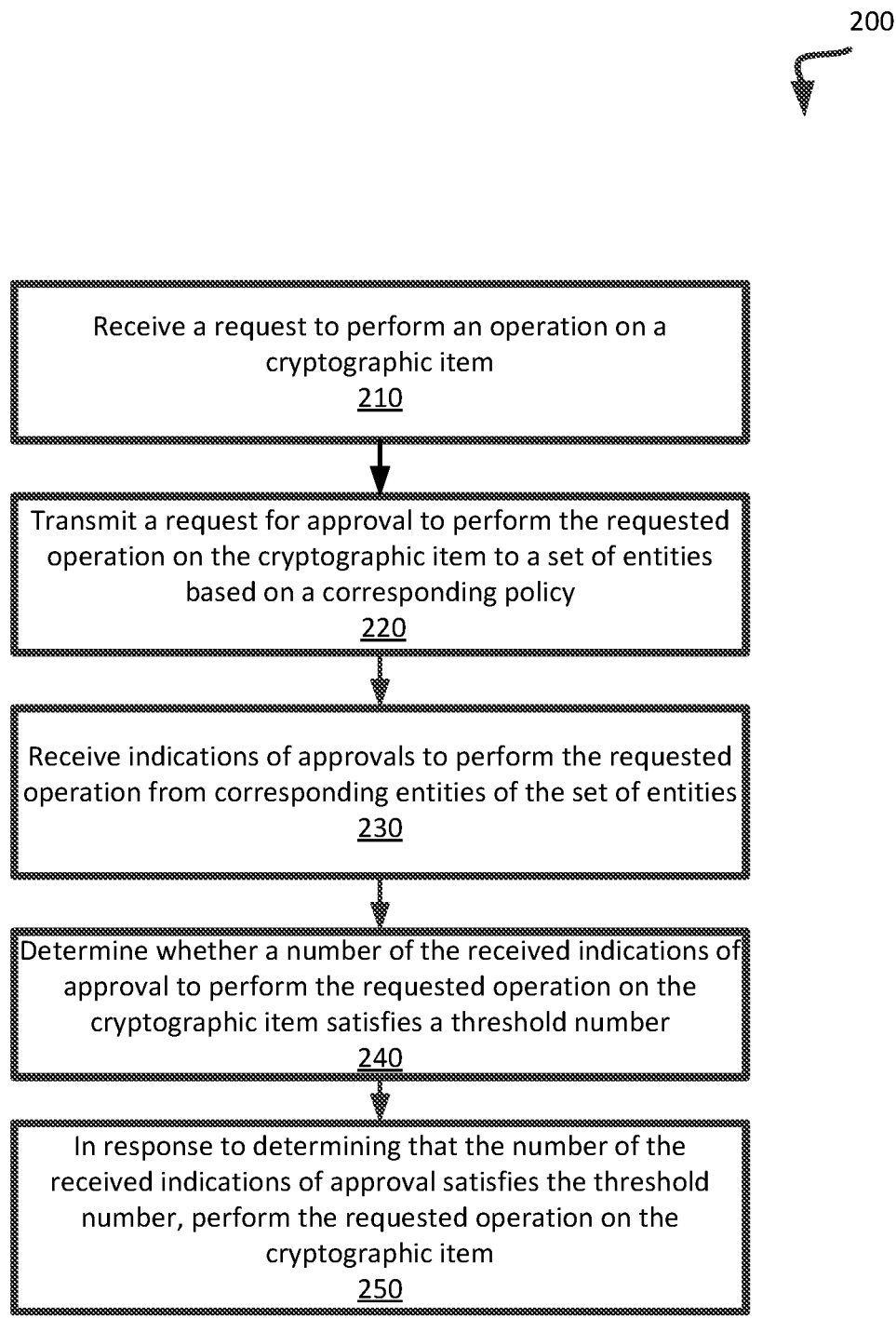
FIG. 2 illustrates a flow diagram of an example method to perform a requested operation with a cryptographic item upon receiving quorum approval in accordance with embodiments of the disclosure.

FIG. 2 illustrates a flow diagram of an example method 200 to perform a requested operation with a cryptographic item upon receiving quorum approval. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the key management system 120 of FIG. 1.

As shown in FIG. 2, the method 200 may begin with the processing logic receiving a request to perform an operation on a cryptographic item (block 210). In embodiments, the processing logic may receive the request from application 130 of FIG. 1. In some embodiments, upon receiving the request to perform the operation, the key management system may assign an identifier to the request that may be used to subsequently identify the requested operation. In an embodiment, the cryptographic item may be a cryptographic key that is utilized to perform cryptographic operations. In embodiments, the requested operation received at block 210 may correspond to an operation to be performed on the cryptographic key. For example, the requested operation may correspond to a request to export the cryptographic key to the application for use in cryptographic operations. Other examples of requested operations performed with respect to a cryptographic key may include modifying a cryptographic key, assigning a cryptographic key to a new group, deleting a cryptographic key, etc.

In embodiments, the cryptographic item may be a cryptographic plugin (also referred to as "plugin" hereafter). A cryptographic plugin may be a program component of the key management system that is operated within a sandbox of the key management system. For example, the cryptographic plugins may be provided in a computing environment with less permissions than that of the key management system. Such an environment may limit access of a corresponding plugin to the cryptographic keys and conditions assigned to the plugin. The plugins may provide functionality associated with the cryptographic keys for use with applications. In embodiments, the requested operation at block 210 may correspond to an operation to be performed on a cryptographic plugin. For example, the requested operation may correspond to modifying the cryptographic plugin. Examples of modifying the cryptographic plugin may include changing the cryptographic keys and/or conditions that are assigned to the plugin. Other examples of operations that may be performed on the cryptographic plugin may include assigning the cryptographic plugin to a new group, deleting the cryptographic plugin, modifying operations performed by the cryptographic plugin, etc.

In some embodiments, the requested operation may be associated with a group of entities assigned to the cryptographic data item. For example, the application may transmit a request to the key management system to modify the quorum policy associated with a group. Examples of modifications to the quorum policy may include changing the number of approvals required to perform an operation, changing the types of operations that require quorum approval, etc. In embodiments, the requested operation may be associated with the entities (e.g., entities 110*a-n* of FIG. 1) that approve requested operations for a group. For example, the application may transmit a request to the key management system to add, remove, or modify the entities for a group that are able to approve a requested operation.

The processing logic may transmit a request for approval to perform the requested operation on the cryptographic item to a set of entities based on a corresponding policy (block 220). As previously discussed, the cryptographic items stored at the key management system may be assigned to a group. Each of the groups may have an associated quorum policy and approving entities. The quorum policy for a particular group may specify which operations require quorum approval for the cryptographic items assigned to the particular group. For example, the policy may specify that any operation that exports, modifies, or deletes a cryptographic item requires quorum approval before that operation is performed. A modification of the quorum policy itself may be approved by the set of entities of a group that is assigned to the quorum policy. In some embodiments, a modification of the quorum policy may be assigned to another set of entities of another group. For example, the modification of the quorum policy may be approved by a higher level quorum that may be used to approval or reject a modification to a quorum policy that is applied for a lower level quorum.

The policy may specify a threshold number of approvals that are required before the operation is performed on the cryptographic item. For example, the policy may specify that three approvals from approving entities should be received before the operation is performed on the cryptographic item. In embodiments, the policy may specify different thresholds for different subsets of entities whose approval is required to perform the operation. For example, the policy may specify that three approvals may be received from subset A of the approving entities and/or that two approvals may be received from subset B of the approving entities.

Upon identifying the quorum policy of the group associated with the cryptographic item, the key management system may transmit a request for approval to perform the requested operation to the set of entities. In embodiments, the key management system may query a data structure that includes identification information, such as a name, phone number, email address, etc. for the set of entities and provide the request for approval to the set of entities using the identification information. In embodiments, the request for approval may be an email, text message or other type of message sent to a computing device of a particular entity. In an embodiment, the request for approval may include a selectable icon, prompt or hyperlink to allow the entity to approve or reject the operation.

The processing logic may receive indications of approvals to perform the requested operation from corresponding entities of the set of entities (block 230). The indications of approvals may be received from one or more entities of the set of entities that can approve operations for a particular group. In some embodiments, upon receiving approval from an approving entity, the key management system may log the approval from the approving entity in a data structure stored at the key management system.

The processing logic may determine whether a number of the received indications of approval to perform the requested operation on the cryptographic item satisfies a threshold number (block 240). As previously discussed, the quorum policy of a group may specify a threshold number of approvals required to perform the operation on the cryptographic item. For example, the quorum policy may specify that two entities of the group approve the operation before the operation is performed. If two entities of the group have approved the requested operation, then the threshold number of received indications of approval is satisfied. If less than two entities of the group have approved the requested operation, then the threshold number of received indications of approval is not satisfied. If the threshold number of received indications of approval is not satisfied, then the requested operation may not be performed on the cryptographic item.

The processing logic may perform the requested operation on the cryptographic item in response to determining that the number of received indications of approval satisfies the threshold number (block 250). For example, if the requested operation is exporting a cryptographic key, then the key management system may transmit a copy of the cryptographic key to the application for use in cryptographic operations. In another example, if the requested operation is modifying a cryptographic plugin, then the key management system may modify the cryptographic plugin. In a further example, if the operation is modifying the quorum policy and/or entities of a group, then the key management system may modify the quorum policy and/or entities of the group. In embodiments, upon performance of the requested operation, the key management system may transmit a notification to the application that indicates the operation has been performed. In some embodiments, the results of the operation may be retrieved by the application. For example, the key management system may store an indication or notification that the operation has been performed. The application may verify the status of the operation by retrieving the indication or notification of the operation at the key management system. For example, the application may periodically verify the status of the operation at the key management system. If the status indicates that the operation has been approved or has been performed, then the application may subsequently request or retrieve the result of the performed operation. Otherwise, if the status indicates that the operation has not yet been approved or performed, then the application may determine to request or retrieve the result of the performed operation at a later time after the status has changed.

Figure 3:
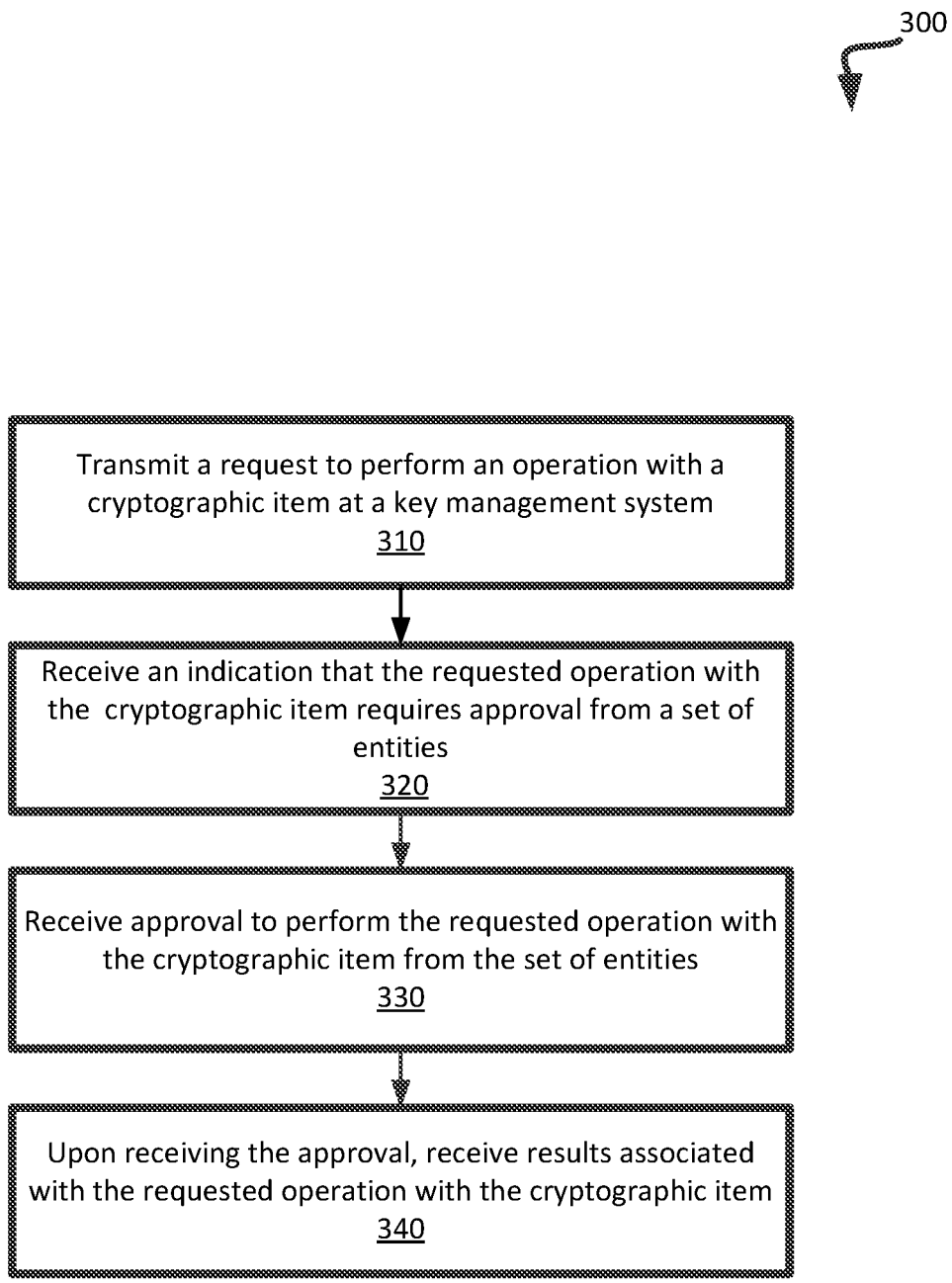
FIG. 3 illustrates a flow diagram of an example method to receive results of a requested operation upon receiving approval from a set of entities in accordance with embodiments of the disclosure.

FIG. 3 illustrates a flow diagram of an example method 300 to receive results of a requested operation upon receiving approval from a set of entities. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by application 130 of FIG. 1.

As shown in FIG. 3, the method 300 may begin with the processing logic transmitting a request to perform an operation with a cryptographic item at a key management system (block 310). The request may identify one or more cryptographic items stored at the key management system and a type of operation to be performed with the cryptographic item. For example, the request may identify the requested operation as exporting a cryptographic key stored at the key management system. In embodiments, the request may include a data object that a cryptographic operation is to be performed on. For example, the application may provide a data object along with the request. The requested operation may be to encrypt the data object using a cryptographic key or cryptographic plugin stored at the key management system.

Upon transmitting the request to perform the operation, the application may receive an indication that the requested operation with the cryptographic item required approval from a set of entities (block 320). In embodiments, the indication may be in the form of a message transmitted to the application. The indication may include information from the quorum policy associated with the cryptographic item. For example, the indication may include the number of approvals needed to perform the operation and/or which entities may approve the operation. In an embodiment, the indication may include a selectable icon that allows the application to transmit a request for approval to the key management system. The request for approval may cause the key management system to transmit approval requests to the approving entities of the cryptographic item.

The application may receive approval to perform the requested operation with the cryptographic item from the set of entities (block 330). For example, the application may receive approval to perform the requested operation when the number of received indications of approval satisfies a threshold number. The threshold number may be specified in the quorum policy of the group that is assigned to the cryptographic item.

Upon receiving the approval, the application may receive results associated with the requested operation with the cryptographic item (block 340). For example, if the requested operation was to export a cryptographic key, then the application may receive a copy of the cryptographic key. In another example, if the request to perform an operation included a data object and the requested operation is to encrypt the data object using a cryptographic key of the key management system, then the application may receive the data object that has been encrypted using the cryptographic key. If the requested operation was to modify a plugin, quorum policy and/or entity, then the application may receive a notification confirming that the modification has been made.

Figure 4A:
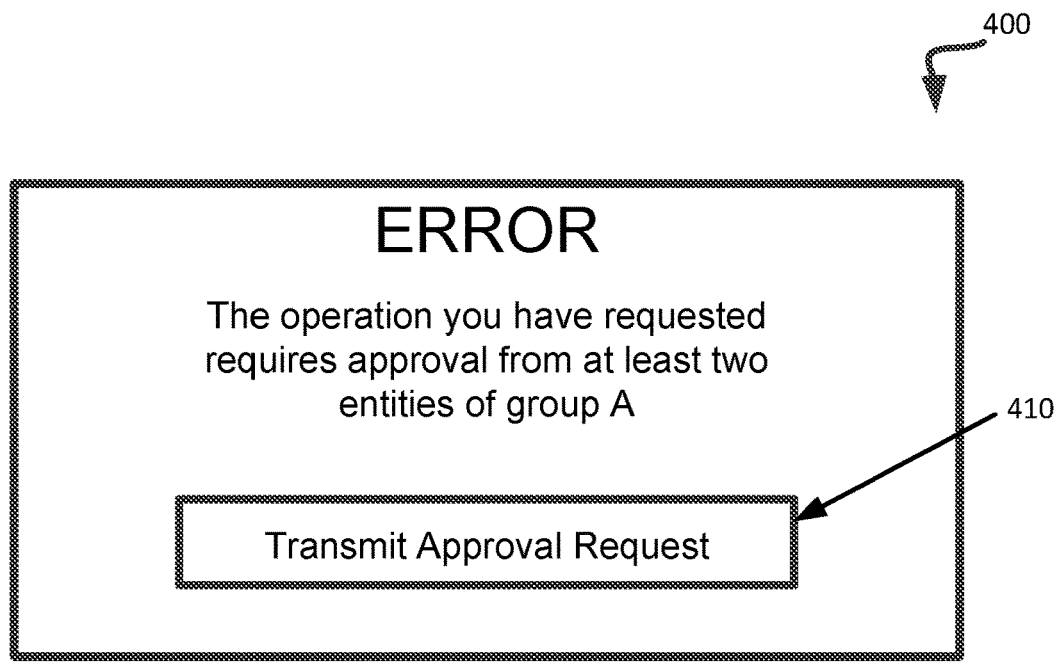
FIG. 4A illustrates an indication that a requested operation requires quorum approval in accordance with an embodiment of the disclosure.

FIG. 4A illustrates an example indication 400 that a requested operation requires quorum approval. The indication 400 may be received by an application requesting to perform an operation with a cryptographic item of a key management system. Upon the key management system determining that the requested operation requires quorum approval, the key management system may transmit the indication 400 to the application requesting the operation. In embodiments, the indication may include a message alerting the application that quorum approval is required. In an embodiment, the indication may include quorum policy information. Referring to FIG. 4A, the indication 400 includes quorum policy information specifying that the requested operation requires approval from at least two entities of group A, which may be the assigned group of the cryptographic item.

In embodiments, the indication 400 may include a selectable icon 410 that allows the requesting application to transmit an approval request to the key management system. The approval request may cause the key management system to generate requests for approval and transmit the requests for approval to the entities whose approval is required to perform the operation. In some embodiments, the key management system may generate and transmit requests for approval without receiving an approval request from the application. For example, upon determining that a requested operation required quorum approval, the key management system may generate and transmit the requests for approval to the approving entities.

Figure 4B:
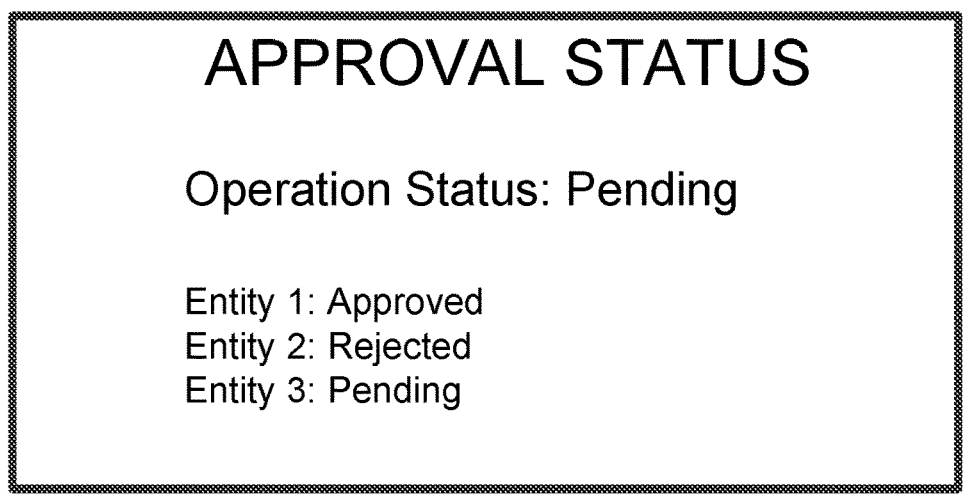
FIG. 4B illustrates a user interface to determine the approval status of a pending requested operation in accordance with embodiments of the disclosure.

FIG. 4B illustrates an example user interface 425 to determine the approval status of a pending requested operation. In an embodiment, the user interface 425 may be provided to an application by the key management system in response to a request for approval status by the application. For example, the application may transmit an approval status request to the key management system. The approval status request may include an identifier assigned to the initial request to perform the operation with the cryptographic item. The assigned identifier may be used by the key management system to identify the operation associated with the approval status request. In embodiments, the user interface 425 may be provided as a user interface in a web browser that may be accessed by the application.

The user interface 425 may include a status of the requested operation and the approval status of each of the approving entities for the group (e.g., Entities 1-3). In embodiments, the user interface 425 may include other information associated with the requested operation, such as the type of operation to be performed, the cryptographic item the operation is to be performed with, an amount of time the request for approval has been pending, and the like. Referring to FIG. 4B, the user interface 425 indicates that Entity 1 of group A has approved the operation and Entity 2 of group A has rejected the operation. Entity 3's approval status is pending, indicating that entity 3 has neither approved nor rejected the operation. Since the required number of approvals (e.g., two) has not been received by the key management system, the operation status is pending, indicating that the requested been performed.

FIG. 4C illustrates an example user interface 450 to determine that a requested operation has been performed by the key management system. The user interface 450 may include information associated with the requested operation similar to the information included in user interface 425 of FIG. 4B. Referring to FIG. 4C, the approval status of Entity 3 has changed from pending to approved, indicating that Entity 3 has approved the operation. Since the threshold number of approvals indicated in user interface 400 of FIG. 4A is two approvals, receiving approval from Entity 1 and Entity 3 satisfies the threshold number of approvals. Accordingly, the operation may be performed with the cryptographic item by the key management system. In embodiments, upon performing the operation, the key management system may update the operation status from pending to performed and transmit the results of the operation to the application that requested the operation.

Figure 5A:
FIG. 5A illustrates a user interface to identify the approval status of a pending requested operation utilizing multiple cryptographic items in accordance with embodiments of the disclosure.

FIG. 5A illustrates an example user interface 500 to determine the approval status of a pending requested operation utilizing multiple cryptographic items. The user interface 500 may include similar information associated with the pending requested operation as user interface 425 of FIG. 4B. In FIG. 5A, the requested operation utilizes two different cryptographic items (e.g., Item A and Item B) stored at the key management system. For example, the requested operation may be a key wrapping operation, where a first cryptographic key (e.g., Item A) is used to encrypt a second cryptographic key (e.g., Item B) to protect the second cryptographic key during transmission or storage in an unprotected environment.

Each of the cryptographic items may be assigned to a different group. Each of the groups may have a different quorum policy and different entities to approve the transaction. For example, Item A may be assigned to a first group having three approving entities (e.g., Entities 1-3) and a quorum policy specifying a threshold value of two approvals are required before the operation is performed. Item B may be assigned to a second group having four approving entities (e.g., Entities 4-7) and a quorum policy specifying a threshold value of three approvals are required before the operation is performed. In embodiments, the corresponding threshold values for all the cryptographic items involved in the requested operation must be satisfied before the operation is performed.

Referring to FIG. 5A, the operation status is pending, indicating that the requested operation has not been performed. The user interface 500 indicates that Entities 4, 5 and 7 have approved the operation for Item B, satisfying the threshold value of the quorum policy for Item B. For Item A, Entity 1 has approved the operation while Entity 2 has rejected the operation and Entity 3's approval status is pending. Since the threshold value of approvals of the quorum policy for Item A has not been satisfied, the operation is not performed on Items A and B by the key management system.

Figure 5B:
FIG. 5B illustrates a user interface to identify that a requested operation utilizing multiple cryptographic items has been performed by the key management system in accordance with some embodiments of the disclosure.

FIG. 5B illustrates an example user interface 550 to determine that a requested operation utilizing multiple cryptographic items has been performed by the key management system. The user interface 550 may include information associated with the requested operation similar to the information included in user interface 500 of FIG. 5A. Referring to FIG. 5B, the approval status of Entity 3 has changed from pending to approved, indicating that Entity 3 has approved the operation. Accordingly, the number of received approvals satisfies the threshold value of approvals required by the quorum policy for Item A. Since the corresponding threshold values for each of the quorum policies of the cryptographic items have been satisfied, the operation may be performed on the cryptographic items by the key management system. In embodiments, upon performing the operation, the key management system may update the operation status from pending to performed and transmit the results of the operation to the application that requested the operation.

Figure 6A:
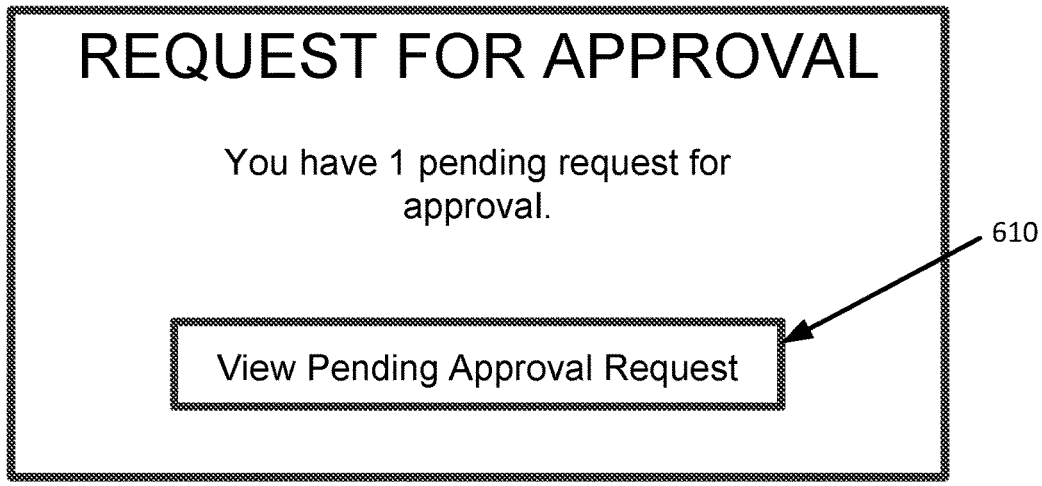
FIG. 6A illustrates a request for approval of an operation to be performed on a cryptographic item of a key management system in accordance with an embodiment of the disclosure.

FIG. 6A illustrates a request for approval 600 for an operation to be performed on a cryptographic item of a key management system. In embodiments, the request for approval 600 may be a user interface provided to a computing device associated with an entity by the key management system. For example, the request for approval 600 may be provided in a notification, such as a text message or email, which is provided to the computing device for display. In an embodiment, the request for approval 600 may be provided in a user interface of a web browser that may be accessed by the entity.

The request for approval 600 may indicate to an entity that the entity has pending requests for approval. In embodiments, the request for approval 600 may include other information associated with the pending approval requests. Examples of other information may include the type of operations to be performed, the entity requesting the operation, the cryptographic item the operation is to be performed on and the like. In embodiments, the request for approval 600 may include a selectable icon 610. The selectable icon 610 may allow an entity to view pending requests for approval. For example, selecting the selectable icon 610 may cause a user interface to be provided by the key management system that presents pending requests for approval to an entity.

Figure 6B:
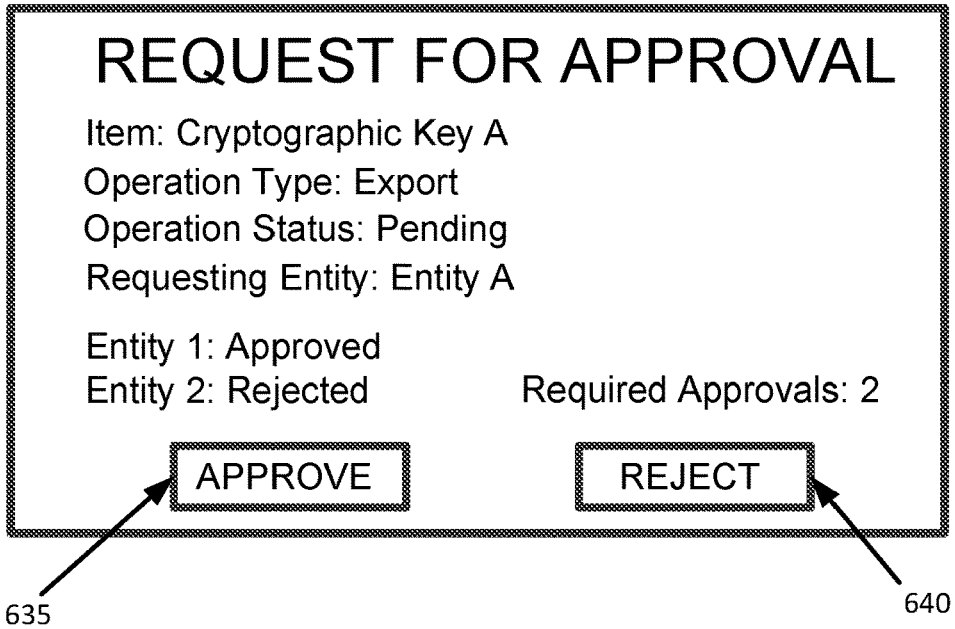
FIG. 6B illustrates a user interface to approve or reject a pending operation to be performed on a cryptographic item of a key management system in accordance with embodiments of the disclosure.

FIG. 6B illustrates a user interface 650 to approve or reject a pending operation to be performed on a cryptographic item of a key management system. In embodiments, the user interface 650 may be provided to a computing device associated with an entity by the key management system. For example, the user interface 650 may be provided in a notification, such as a text message or email, which is provided to the computing device for display. In an embodiment, the user interface 650 may be provided in a user interface of a web browser that may be accessed by the entity. The user interface 650 may include information associated with the request for approval. Examples of information associated with the request for approval may include the cryptographic item the operation is to be performed on, the type of operation to be performed, the status of the operation, the entity requesting the operation, the approval status of other approving entities, the number of approvals required by the quorum policy, etc.

Referring to FIG. 6B, the user interface 650 includes information associated with the request for approval. For example, the user interface 650 indicates that the cryptographic item the operation is to be performed with Cryptographic Item A. The user interface 650 indicates that the type of operation is exporting Cryptographic Key A to the requesting entity. The user interface 650 further indicates that the requesting entity is Entity A, the status of the operation is pending and the number of required approvals to perform the operation is two. The user interface 650 includes selectable icons 635, 640 that may be selected by the approving entity. Selectable icon 635 may be selected by the entity if the entity approves the operation and selectable icon 640 may be selected by the entity is the entity rejects the operation.

In FIG. 6B, Entity 1 has approved the operation and Entity 2 has rejected the operation. Accordingly, if the approving entity selects the selectable icon 635, thereby approving the operation, then Cryptographic Key A will be exported to requesting Entity A. Conversely, if the approving entity selects the selectable icon 640, rejecting the operation, then Cryptographic Key A will not be exported to requesting Entity A.

In embodiments, the request for approval may include a pending time. The pending time may correspond to an amount of time that has elapsed since the request for approval was transmitted to the approving entities by the key management system. In some embodiments, the request for approval may be assigned a pending time threshold by the key management system. If the pending time for a request for approval exceeds the pending time threshold, then the key management system may not perform the requested operation and cancel the request for approval as the threshold number of approvals have not been received within the pending time threshold. For example, if the pending time threshold assigned to a request for approval is two days, and more than two days has elapsed since the key management system transmitted the request for approval to the approving entities, then the operation may not be performed and the request for approval may be canceled. In embodiments, the pending time threshold may be determined based on a quorum policy. For example, a quorum policy of a group may assign a pending time threshold of two days for requests for approval of operations being performed on cryptographic items of that group.

In embodiments, the key management system may utilize two-factor authentication in receiving approval from approving entities. For example, in addition to providing approval to perform an operation via the user interface 650, an approving entity may be required to provide an additional approval via another client device associated with the approving entity.

Figure 7:
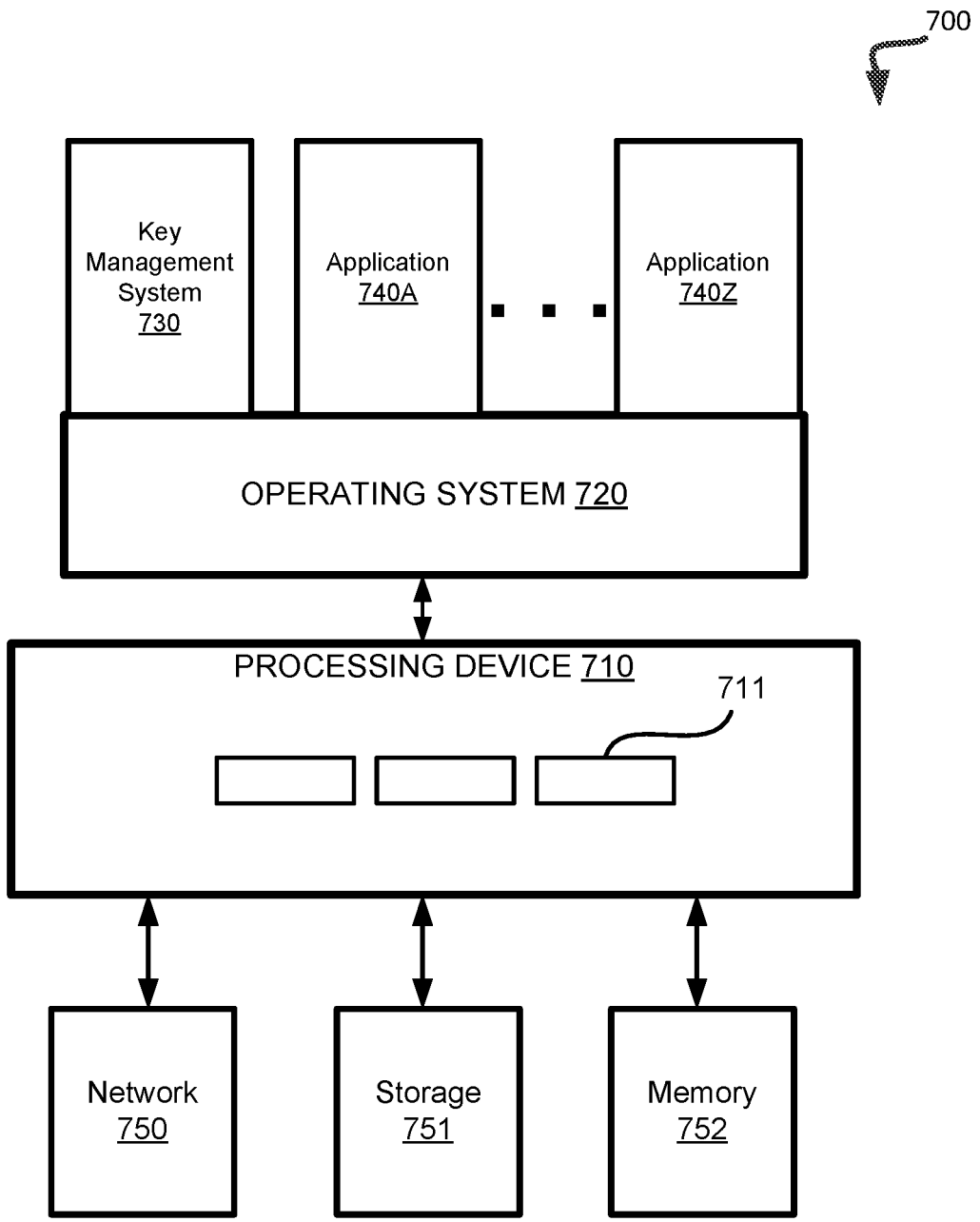
FIG. 7 illustrates an example network server with a key management system to acquire quorum approval to perform an operation on a cryptographic item in accordance with some embodiments of the present disclosure.

FIG. 7 illustrates an example network server 700 with a key management system to acquire quorum approval to perform an operation on a cryptographic item, in accordance with some embodiments of the present disclosure. In general, a key management system 730 may be hosted by a network server to provide secure use of cryptographic keys for one or more other applications 740A to 740Z that are also hosted by the network server or another network server. The key management system 730 may correspond to key management system 120 of FIG. 1. Furthermore, the key management system 730 of FIG. 7 corresponds to an implementation of the present disclosure that is based on a secure enclave.

As shown in FIG. 7, the network server 700 may include a processing device 710 that may execute an operating system 720. Furthermore, the processing device 710 may include one or more internal cryptographic keys 711 that may be used to encrypt and decrypt data stored in a portion of a memory that is assigned to a secure enclave of the key management system 730. The access to the data of the key management system 730 in the secure enclave (e.g., data stored at a storage resource) may be protected from the one or more applications 740A to 740Z and the operating system 720. For example, the access to the data of the secure enclave corresponding to the key management system 730 may be protected by the use of one of the internal cryptographic keys 711 that are internal to the processing device 710 so that the access to the data is based on a hardware access as opposed to a software access. The operating system 720 may be associated with a first privilege level and the key management system 730 and the applications 740A to 740Z may be associated with a second privilege level where the first privilege level of the operating system is more privileged than the second privilege level of the various applications that are run on the operating system 720 (e.g., the more privileged level allows access to more resources of the network server than the less privileged level). Thus, the operating system 720 may be allowed access to resources of the applications 740A to 740Z. However, since the key management system 730 is assigned to a secure enclave where access to the data of the secure enclave is based on the use of an internal cryptographic key 711 of the processing device 711, the operating system 720 may not be able to access the data of the key management system 730 despite having a more privileged level of access than the key management system 730. The master key that is used to decrypt data at the storage resource may be an internal cryptographic key 711.

In operation, the key management system 730 may be hosted on a network server with the applications 740A to 740Z. The application may request to perform an operation on a cryptographic item stored in the secure enclave of the key management system 730. Upon receiving the required number of approvals to perform the operation, the operation may be performed on the cryptographic item. The processing device 710 may use an instruction to use one of its internal cryptographic keys 711 that is based on the identification of the key management system 730 to perform the operation on the cryptographic item stored in the memory of the secure enclave of the key management system 730. For example, the cryptographic item may be decrypted when read from the storage 751 or memory 752 associated with the processing device 710 or at another storage resource over a network 750 (e.g., at a storage device of the storage resource) and exported to the application. Although FIG. 7 illustrates that the key management system 730 may provide secure cryptographic item management for an application 740A to 740Z on the same network server, the key management system 730 may alternatively be hosted by another network server or may be hosted by another network server that is external to any data center or network cluster that includes the network servers hosting applications 740A to 740Z.

Figure 8:
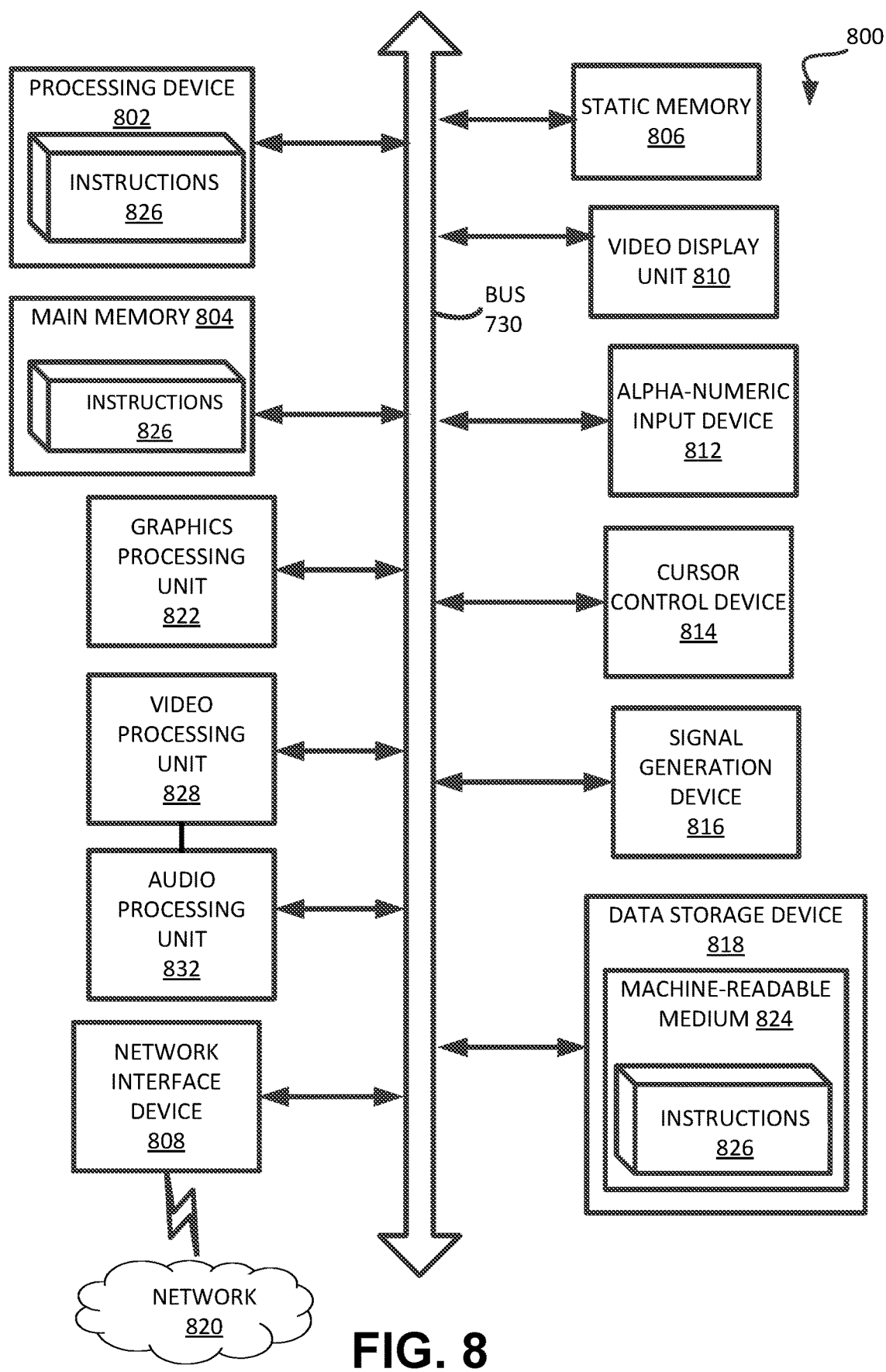
FIG. 8 illustrates an example computer system in which embodiments of the present disclosure operate.

FIG. 8 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a sequence (or multiple sequences) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a computer-readable medium) on which is stored one or more sequences of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In one implementation, the instructions 826 include instructions to implement functionality corresponding to a secure key caching client. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sequences of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system comprising:
   a memory; and
   a processing device, communicably coupled to the memory, the processing device to:
   receive a request to perform an operation with a cryptographic item;
   identify a quorum policy based on a group associated with the cryptographic item, wherein the group is further associated with a set of entities, and wherein the quorum policy identifies one or more operations to be approved by one or more entities of the set of entities;
   determine, based on the quorum policy, whether the requested operation requires approval;
   responsive to determining that the requested operation requires approval, transmit a request for approval to perform the requested operation with the cryptographic item, the request being transmitted to the set of entities based on the quorum policy associated with the cryptographic item;
   receive indications of approval to perform the requested operation from corresponding entities of the set of entities;
   determine whether a number of the received indications of approval to perform the requested operation with the cryptographic item satisfies a threshold number specified by the quorum policy; and
   in response to determining that the number of the received indications of approval from the corresponding entities of the set of entities satisfies the threshold number, perform the requested operation with the cryptographic item.

2. The system of claim 1, wherein to determine whether the number of the received indications of approval to perform the requested operation with the cryptographic item satisfies the threshold number, the processing device is further to:
   determine whether at least one of a first number of the received indications of approval from a first subset of the set of entities satisfies a second threshold number or a second number of the received indications of approval from a second subset of the set of entities satisfies a third threshold number.

3. The system of claim 1, wherein the cryptographic item comprises a cryptographic key, and wherein the operation corresponds to exporting the cryptographic key.

4. The system of claim 1, wherein the cryptographic item comprises a cryptographic plugin that utilizes a cryptographic key to perform cryptographic operations, and wherein the operation corresponds to a modification of the cryptographic plugin.

5. The system of claim 1, wherein the operation comprises a modification of one or more entities of the set of entities.

6. The system of claim 1, wherein the cryptographic item comprises a first cryptographic item and a second cryptographic item and wherein to transmit the request for approval to perform the requested operation, the processing device is further to:
   transmit a first request for approval to perform the requested operation on the first cryptographic item to a first set of entities associated with the first cryptographic item based on a first policy associated with the first cryptographic item; and
   transmit a second request for approval to perform the requested operation on the second cryptographic item to a second set of entities associated with the second cryptographic item based on a second policy associated with the second cryptographic item.

7. The system of claim 1, wherein to determine whether the number of the received indications of approval to perform the requested operation with the cryptographic item satisfies the threshold number, the processing device is further to:
   determine that the number of the received indications of approval to perform the requested operation with the cryptographic item does not satisfy the threshold number; and
   in response to determining that the number of the received indications of approval to perform the requested operation with the cryptographic item does not satisfy the threshold number, determine to not perform the requested operation with the cryptographic item.

8. A non-transitory machine-readable storage medium storing instructions that cause a processing device to:
   receive a request to perform an operation on a cryptographic item;
   identify a quorum policy based on a group associated with the cryptographic item, wherein the group is further associated with a set of entities, and wherein the quorum policy identifies one or more operations that require approval by one or more entities of the set of entities;

determine, based on the quorum policy, whether the requested operation requires approval;

responsive to determining that the requested operation requires approval, transmit a request for approval to perform the requested operation on the cryptographic item, the request being transmitted to the set of entities based on the quorum policy associated with the cryptographic item;

receive indications of approval to perform the requested operation from corresponding entities of the set of entities;

determine whether a number of the received indications of approval to perform the requested operation on the cryptographic item satisfies a threshold number specified by the quorum policy; and in response to determining that the number of the received indications of approval from the corresponding entities of the set of entities satisfies the threshold number, perform the requested operation on the cryptographic item.

9. The non-transitory machine-readable storage medium of claim 8, wherein to determine whether the number of the received indications of approval to perform the requested operation on the cryptographic item satisfies the threshold number, the processing device is further to:

determine whether at least one of a first number of the received indications of approval from a first subset of the set of entities satisfies a second threshold number or a second number of the received indications of approval from a second subset of the set of entities satisfies a third threshold number.

10. The non-transitory machine-readable storage medium of claim 8, wherein the cryptographic item comprises a cryptographic key, and wherein the operation corresponds to exporting the cryptographic key.

11. The non-transitory machine-readable storage medium of claim 8, wherein cryptographic item comprises a cryptographic plugin that utilizes a cryptographic key to perform cryptographic operations, and wherein the operation corresponds to a modification of the cryptographic plugin.

12. The non-transitory machine-readable storage medium of claim 8, wherein the operation comprises a modification of one or more entities of the set of entities.

13. The non-transitory machine-readable storage medium of claim 8, wherein the cryptographic item comprises a first cryptographic item and a second cryptographic item and wherein to transmit the request for approval to perform the requested operation, the processing device is further to:

transmit a first request for approval to perform the requested operation on the first cryptographic item to a first set of entities associated with the first cryptographic item based on a first policy associated with the first cryptographic item; and transmit a second request for approval to perform the requested operation on the second cryptographic item to a second set of entities associated with the second cryptographic item based on a second policy associated with the second cryptographic item.

14. A method comprising:

receiving a request to perform an operation with a cryptographic item;

identifying a quorum policy based on a group associated with the cryptographic item, wherein the group is further associated with a set of entities, and wherein the quorum policy identifies one or more operations that require approval by one or more entities of the set of entities;

determining, based on the quorum policy, whether the requested operation requires approval;

responsive to determining that the requested operation requires approval, transmitting a request for approval to perform the requested operation with the cryptographic item, the request being transmitted to the set of entities based on the quorum policy associated with the cryptographic item;

receiving indications of approval to perform the requested operation from corresponding entities of the set of entities;

determining whether a number of the received indications of approval to perform the requested operation with the cryptographic item satisfies a threshold number specified by the quorum policy; and in response to determining that the number of the received indications of approval from the corresponding entities of the set of entities satisfies the threshold number, performing the requested operation with the cryptographic item.

15. The method of claim 14, wherein determining whether the number of the received indications of approval to perform the requested operation with the cryptographic item satisfies the threshold number comprises:

determining whether at least one of a first number of the received indications of approval from a first subset of the set of entities satisfies a second threshold number or a second number of the received indications of approval from a second subset of the set of entities satisfies a third threshold number.

16. The method of claim 14, wherein the cryptographic item comprises a cryptographic key, and wherein the operation corresponds to exporting the cryptographic key.

17. The method of claim 14, wherein the cryptographic item comprises a cryptographic plugin that utilizes a cryptographic key to perform cryptographic operations, and wherein the operation corresponds to a modification of the cryptographic plugin.

18. The method of claim 14, wherein the operation comprises a modification of one or more entities of the set of entities.

19. The method of claim 14, wherein the cryptographic item comprises a first cryptographic item and a second cryptographic item and wherein transmitting the request for approval to perform the requested operation comprises:

transmitting a first request for approval to perform the requested operation on the first cryptographic item to a first set of entities associated with the first cryptographic item based on a first policy associated with the first cryptographic item; and transmitting a second request for approval to perform the requested operation on the second cryptographic item to a second set of entities associated with the second cryptographic item based on a second policy associated with the second cryptographic item.

20. The method of claim 14, wherein determining whether the number of the received indications of approval to perform the requested operation with the cryptographic item satisfies the threshold number comprises:

determining that the number of the received indications of approval to perform the requested operation with the cryptographic item does not satisfy the threshold number; and in response to determining that the number of the received indications of approval to perform the requested operation with the cryptographic item does not satisfy the threshold number, determining to not perform the requested operation with the cryptographic item.

* * * * *